(12) United States Patent
Ogawa et al.

(10) Patent No.: US 9,190,684 B2
(45) Date of Patent: Nov. 17, 2015

(54) FUEL CELL MODULE

(75) Inventors: Tetsuya Ogawa, Wako (JP); Keiji Tsukamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 167 days.

(21) Appl. No.: 14/113,660

(22) PCT Filed: Mar. 5, 2012

(86) PCT No.: PCT/JP2012/056213
§ 371 (c)(1),
(2), (4) Date: Oct. 24, 2013

(87) PCT Pub. No.: WO2012/147419
PCT Pub. Date: Nov. 1, 2012

(65) Prior Publication Data
US 2014/0045085 A1 Feb. 13, 2014

(30) Foreign Application Priority Data

Apr. 28, 2011 (JP) .................................. 2011-101244

(51) Int. Cl.
*H01M 8/04* (2006.01)
*H01M 8/06* (2006.01)
(Continued)

(52) U.S. Cl.
CPC ............. *H01M 8/0618* (2013.01); *C01B 3/384* (2013.01); *C01B 3/386* (2013.01); *H01M 8/04955* (2013.01); *H01M 8/0631* (2013.01); *C01B 2203/0233* (2013.01); *C01B 2203/0261* (2013.01); *C01B 2203/066* (2013.01); *C01B 2203/0827* (2013.01); *C01B 2203/1235* (2013.01); *C01B 2203/1288* (2013.01); *C01B2203/142* (2013.01); *H01M 8/04223* (2013.01); *H01M 2008/1293* (2013.01); *Y02E 60/50* (2013.01); *Y02E 60/525* (2013.01)

(58) Field of Classification Search
None
See application file for complete search history.

(56) References Cited

U.S. PATENT DOCUMENTS 6,524,550 B1 * 2/2003 Chintawar et al. ............ 423/650
6,846,585 B2 * 1/2005 Robb et al. ..................... 429/412
(Continued)

FOREIGN PATENT DOCUMENTS

EP 1 188 712 A2 3/2002
EP 1 840 997 A1 10/2007
(Continued)

OTHER PUBLICATIONS

International Search Report dated Jun. 6, 2012.
(Continued)

*Primary Examiner* — Gregg Cantelmo
(74) *Attorney, Agent, or Firm* — Rankin, Hill & Clark LLP

(57) ABSTRACT

A fuel cell module includes a fuel cell stack, a partial oxidation reformer for reforming a mixed gas of a raw fuel and an oxygen-containing gas, a steam reformer for reforming a mixed gas of the raw fuel and water vapor, an evaporator for supplying water vapor to the steam reformer, a heat exchanger for raising the temperature of the oxygen-containing gas by heat exchange with a combustion gas, and an exhaust gas combustor for producing the combustion gas. A fuel gas discharge chamber of the steam reformer is connected to a fuel gas supply passage of the fuel cell stack through a fuel gas channel, a fuel gas outlet of the partial oxidation reformer is connected to a mixed gas supply chamber of the steam reformer through a fuel gas pipe, and a water vapor pipe extending from the evaporator is merged to the fuel gas pipe.

8 Claims, 10 Drawing Sheets

(51) Int. Cl.
*C01B 3/38* (2006.01)
*H01M 8/12* (2006.01)

(56) References Cited

U.S. PATENT DOCUMENTS

| | | | |
|---|---|---|---|
| 2004/0038095 A1* | 2/2004 | Kushibiki et al. | 429/20 |
| 2005/0089732 A1* | 4/2005 | Aoyama et al. | 429/20 |
| 2007/0286797 A1* | 12/2007 | Behrens et al. | 423/644 |
| 2008/0219901 A1* | 9/2008 | Yoon et al. | 422/197 |
| 2008/0263953 A1* | 10/2008 | Okada et al. | 48/127.9 |
| 2009/0053569 A1* | 2/2009 | Perry et al. | 429/26 |
| 2011/0053017 A1 | 3/2011 | Takahashi | |

FOREIGN PATENT DOCUMENTS

| | | |
|---|---|---|
| EP | 1 909 349 | 4/2008 |
| EP | 2 426 769 A1 | 3/2012 |
| JP | 2004022380 A * | 1/2004 |
| JP | 2004-192958 | 7/2004 |
| JP | 2004-319420 | 11/2004 |
| JP | 2005-285693 | 10/2005 |
| JP | 2005-293951 | 10/2005 |
| JP | 2006-190605 | 7/2006 |
| JP | 2007--59377 | 3/2007 |
| JP | 2007-091542 | 4/2007 |
| JP | 2007-179756 | 7/2007 |
| JP | 2007311072 A * | 11/2007 |
| JP | 2010-211931 | 9/2010 |
| JP | 2010-238595 | 10/2010 |
| JP | 2011-060553 | 3/2011 |
| WO | 2010/125731 A1 | 11/2010 |

OTHER PUBLICATIONS

This application is co-pending with U.S. Appl. No. 14/113,673, filed Oct. 24, 2013.
European Office Action dated Dec. 23, 2014, Application No. 12714403.8, 4 pages.
Japanese Office Action dated Aug. 5, 2014 with English Translation, Application No. JP 2011-101252, corresponding to the present application, U.S. Appl. No. 14/113,673, 5 pages.
Japanese Office Action dated Aug. 12, 2014 with English Translation, Application No. JP 2011-101244, corresponding to the present application, U.S. Appl. No. 14/113,660. 3 pages.

* cited by examiner

FIG. 2

FUEL CELL MODULE

TECHNICAL FIELD

The present invention relates to a fuel cell module including a fuel cell stack formed by stacking a plurality of fuel cells for generating electricity by electrochemical reactions of a fuel gas and an oxygen-containing gas.

BACKGROUND ART

Typically, a solid oxide fuel cell (SOFC) employs a solid electrolyte of ion-conductive solid oxide such as stabilized zirconia. The electrolyte is interposed between an anode and a cathode to form an electrolyte electrode assembly (hereinafter also referred to as MEA). The electrolyte electrode assembly is interposed between separators (bipolar plates). In use, generally, predetermined numbers of the electrolyte electrode assemblies and the separators are stacked together to form a fuel cell stack.

Normally, a hydrogen gas produced from hydrocarbon based raw fuel by a reformer is used as a fuel gas supplied to the fuel cell. In the reformer, in general, a reformed gas (fuel gas) is produced, e.g., by applying partial oxidation reforming or steam reforming to such hydrocarbon based raw fuel, e.g., fossil fuel such as metal or LNG.

In this case, since the partial oxidation reformer induces exothermic reaction, the reaction can be started at relatively low temperature, and thus the start-up performance and the follow up performance are good. However, the reforming efficiency is poor.

In contrast, the steam reformer has good reforming efficiency. However, since the steam reformer induces endothermic reaction, the start-up performance and the follow up performance are poor at relatively low temperature.

In this regard, for example, a starting-up method as disclosed in Japanese Laid-Open Patent Publication No. 2006-190605 (hereinafter referred to as Conventional Technique 1) is known. As shown in FIG. 9, Conventional Technique 1 relates to a method for starting-up a SOFC system equipped with a reformer 1a having a reforming catalyst, and an SOFC 2a which uses the reformed gas as a fuel.

The reformer 1a is provided in a manner that a reforming reaction tube 3a containing the reforming catalyst is disposed in a vessel 4a or runs through the vessel 4a. In the reforming reaction tube 3a, an upstream part thereof is filled with a partial oxidation reforming catalyst A and a downstream part thereof is filled with a steam reforming catalyst B, to form a reforming catalyst layered structure.

In the starting-up method, catalyst A having a partial oxidation reforming (POX) function and catalyst B having a steam reforming (SR) function are used. The method includes the steps of: increasing the temperature of catalyst A, by combustion heat or electricity, to a temperature at which POX reaction can proceed; increasing the temperature of catalyst B by POX reaction heat, increasing the temperature of SOFC 2a by feeding the reformed gas to an anode and heating catalyst B by combustion heat generated from combustion of a reformed gas discharged from the anode, or increasing the temperature of catalyst B by POX reaction heat, increasing the temperature of SOFC 2a by feeding a combustion gas produced from combustion of the reformed gas to a cathode and heating catalyst B by this combustion gas; and after catalyst B has been heated to a temperature at which SR reaction can proceed, reducing the proportion of POX reaction or stopping POX reaction and perform SR.

Further, as shown in FIG. 10, a fuel cell disclosed in Japanese Laid-Open Patent Publication No. 2005-293951 (hereinafter referred to as Conventional Technique 2) includes a body 1b of a solid oxide fuel cell, a first fuel gas supply system 2b for supplying a fuel gas to the anode side of the fuel cell body 1b at the time of power generation, a second fuel gas supply system 3b for supplying a small amount of the fuel gas as an oxidation-prevention gas to the anode side of the fuel cell body 1b during a period of starting operation of the fuel cell body 1b and a period in which operation of the fuel cell body 1b is stopped, and an oxygen-containing gas supply system 4b for supplying air as an oxygen-containing gas to the cathode side of the fuel cell body 1b all the time.

The fuel cell body 1b includes a fuel cell FC having a columnar shape formed by stacking a plurality of inter-connectors such that solid electrolytes with electrodes are positioned between the inter-connectors, a burner 5b for pre-heating the fuel cell FC during the period of starting operation, a heat exchanger 6b that is pre-heated together with the fuel cell FC during the period of starting operation and pre-heating the oxygen-containing gas by heat exchange of the exhaust gas discharged from the fuel cell FC with the oxygen-containing gas, and a steam reformer 7b and a partial oxidation reformer 8b as two types reformers. The steam reformer 7b and the partial oxidation reformer 8b are used in combination with the fuel cell FC, and pre-heated together with the fuel cell FC by the burner 5b or the like in the period of starting operation, and heated by heat produced in the fuel cell FC during power generation.

During power generation, the fuel gas required for power generation is supplied to the fuel cell body 1b at a large flow rate using the first fuel gas supply system 2b, and during the period of starting power generation and during the period where power generation is stopped, when the fuel cell body 1b goes through a cell oxidation temperature range, the fuel gas produced by partial oxidation reforming is supplied to the fuel cell body 1b at a small flow rate which is required for prevention of oxidation, by use of the second fuel gas supply system 3b.

SUMMARY OF INVENTION

However, in Conventional Technique 1, the reforming reaction tube 3a is filled with the partial oxidation reforming catalyst A and the steam reforming catalyst B. Water vapor (steam) is supplied into the reforming reaction tube 3a even at the time of performing only partial oxidation reforming. Thus, since heat energy for evaporating water is required at the time of partial oxidation reforming, heat efficiency is lowered, and pressure losses due to water vapor occur. Further, temperature control in the reforming reaction tube 3a is complicated.

Further, in Conventional Technique 2, the steam reformer 7b and the partial oxidation reformer 8b are arranged in parallel, and a large number of solenoid valves SV1 to SV5 are provided. Thus, the circuit is complicated, the cost is expensive, and the operational sequence is complicated.

The present invention has been made to solve the problems of these types, and an object of the present invention is to provide a fuel cell module in which it is possible to suitably maintain a desired start-up performance, a desired follow-up performance, and a desired efficiency in the fuel cell module, and achieve improvement in the durability.

The present invention relates to a fuel cell module including a fuel cell stack formed by stacking a plurality of fuel cells for generating electricity by electrochemical reactions of a fuel gas and an oxygen-containing gas, a partial oxidation reformer for reforming a mixed gas of a raw fuel chiefly containing hydrocarbon and an oxygen-containing gas, a steam reformer for reforming a mixed gas of the raw fuel and water vapor, an evaporator for evaporating water and supplying water vapor to the steam reformer, a heat exchanger for raising the temperature of the oxygen-containing gas by heat exchange with a combustion gas, and supplying the oxygen-containing gas to the fuel cell stack, and an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas.

In the fuel cell module, a fuel gas outlet of the steam reformer is connected to a fuel gas inlet of the fuel cell stack through a fuel gas channel, and a fuel gas outlet of the partial oxidation reformer is connected to a mixed gas inlet of the steam reformer through a fuel pipe, and a water vapor pipe connected to a water vapor outlet of the evaporator is merged to the fuel pipe.

Further, in the fuel cell module, a fuel gas outlet of the steam reformer is connected to a fuel gas inlet of the fuel cell stack through a fuel gas channel, and a water vapor outlet of the evaporator is connected to a mixed gas inlet of the steam reformer through a water vapor pipe, and a fuel pipe connected to a fuel gas outlet of the partial oxidation reformer is merged to the water vapor pipe.

According to the present invention, the water vapor pipe extending from the evaporator is merged to a position in the middle of the fuel pipe extending from the partial oxidation reformer to the steam reformer. Alternatively, the fuel pipe extending from the partial oxidation reformer is merged to a position in the middle of the water vapor pipe extending from the evaporator to the steam reformer.

Thus, since the reduction gas at high temperature (about 600° C.) from the partial oxidation reformer is guided to the steam reformer, the time required for starting operation of the steam reformer (time required for raising the temperature and time for reduction) is reduced.

Further, since the hot reduction gas is supplied from the steam reformer to the fuel gas supply passage of the fuel cell stack through the fuel gas channel, the time required for starting operation of the fuel cell stack (time required for raising the temperature and time for reduction) is reduced advantageously.

Further, the hot reduction gas is supplied from the fuel cell stack to the exhaust gas combustor. Thus, by the combustion gas produced in the exhaust gas combustor, the temperatures of the oxygen-containing gas, the steam reformer and the evaporator are raised, and time required for starting operation of the fuel cell module is reduced effectively.

Further, the water vapor produced in the evaporator does not flow into the partial oxidation reformer. Thus, it becomes possible to suppress steam oxidation of the catalyst in the partial oxidation reformer, and improvement in the durability is achieved easily.

Further, even if heat shortage resulting from variation in the load on the fuel cell stack induces shortage of reforming by the steam reformer, the shortage of reforming can be compensated by the partial oxidation reformer. Thus, it becomes possible to follow the low output and the load variation and suppress fuel shortage and carbon deposition resulting from the shortage of reforming, and improvement in the durability is achieved easily.

The above and other objects, features, and advantages of the present invention will become more apparent from the following description when taken in conjunction with the accompanying drawings in which preferred embodiments of the present invention are shown by way of illustrative example.

BRIEF DESCRIPTION OF DRAWINGS

FIG. 2 is a perspective view showing main components of FC (fuel cell) peripheral equipment of the fuel cell system;

DESCRIPTION OF EMBODIMENTS

Figure 1:
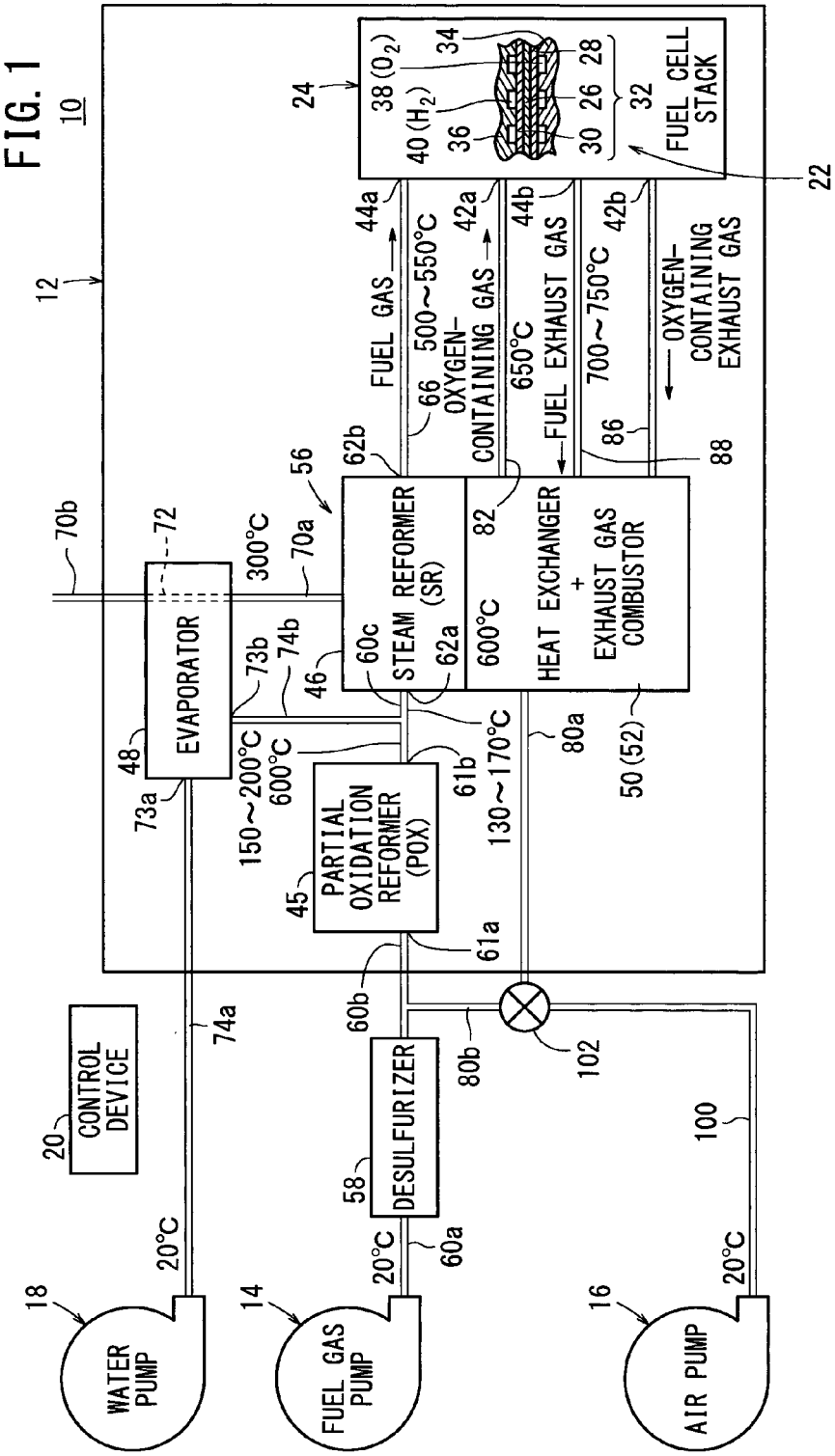
FIG. 1 is a diagram schematically showing a structure of a fuel cell system according to a first embodiment of the present invention.

A fuel cell system 10 according to a first embodiment of the present invention shown in FIG. 1 is used in various applications, including stationary and mobile applications. For example, the fuel cell system 10 is mounted on a vehicle.

The fuel cell system 10 includes a fuel cell module (SOFC module) 12 for generating electrical energy in power generation by electrochemical reactions of a fuel gas (a gas produced by mixing a hydrogen gas, methane, and carbon monoxide) and an oxygen-containing gas (air), a raw fuel supply apparatus (including a fuel gas pump) 14 for supplying a raw fuel (e.g., city gas) to the fuel cell module 12, an oxygen-containing gas supply apparatus (including an air pump) 16 for supplying the oxygen-containing gas to the fuel cell module 12, a water supply apparatus (including a water pump) 18 for supplying water to the fuel cell module 12, and a control device 20 for controlling the amount of electrical energy generated in the fuel cell module 12.

The fuel cell module 12 includes a fuel cell stack 24 formed by stacking a plurality of solid oxide fuel cells 22 in a vertical direction (or in a horizontal direction). For example, the fuel cell 22 includes an electrolyte electrode assembly 32 (MEA). The electrolyte electrode assembly 32 includes a cathode 28, an anode 30, and an electrolyte 26 interposed between the cathode 28 and the anode 30. For example, the electrolyte 26 is made of ion-conductive solid oxide such as stabilized zirconia.

A cathode side separator 34 and an anode side separator 36 are provided on both sides of the electrolyte electrode assembly 32. An oxygen-containing gas flow field 38 for supplying an oxygen-containing gas to the cathode 28 is formed in the cathode side separator 34, and a fuel gas flow field 40 for supplying a fuel gas to the anode 30 is formed in the anode side separator 36. As the fuel cell 22, various types of conventional SOFC can be adopted.

An oxygen-containing gas supply passage 42a, an oxygen-containing gas discharge passage 42b, a fuel gas supply passage (fuel gas inlet) 44a, and a fuel gas discharge passage 44b extend through the fuel cell stack 24. The oxygen-containing gas supply passage 42a is connected to an inlet of each oxygen-containing gas flow field 38, the oxygen-containing gas discharge passage 42b is connected to an outlet of each oxygen-containing gas flow field 38, the fuel gas supply passage 44a is connected to an inlet of each fuel gas flow field 40, and the fuel gas discharge passage 44b is connected to an outlet of each fuel gas flow field 40.

The fuel cell module 12 includes a partial oxidation reformer (POX) 45 for reforming a mixed gas of a raw fuel chiefly containing hydrocarbon and the oxygen-containing gas, a steam reformer (SR) 46 for reforming a mixed gas of the raw fuel and water vapor, an evaporator 48 for evaporating water and supplying the water vapor to the steam reformer 46, a heat exchanger 50 for raising the temperature of the oxygen-containing gas by heat exchange with a combustion gas and supplying the oxygen-containing gas to the fuel cell stack 24, and an exhaust gas combustor 52 for combusting the fuel gas discharged from the fuel cell stack 24 as a fuel exhaust gas and the oxygen-containing gas discharged from the fuel cell stack 24 as an oxygen-containing exhaust gas thereby to produce the combustion gas.

Basically, the fuel cell module 12 includes the fuel cell stack 24 and FC (fuel cell) peripheral equipment 56. The FC peripheral equipment 56 includes the partial oxidation reformer 45, the steam reformer 46, the evaporator 48, the heat exchanger 50, and the exhaust gas combustor 52. Further, as described later, no exhaust gas pipes are provided for connecting the steam reformer 46, the heat exchanger 50 and the exhaust gas combustor 52.

In the FC peripheral equipment 56, the exhaust gas combustor 52 is provided integrally in the heat exchanger 50. The steam reformer 46 is provided adjacent to one end of the heat exchanger 50.

Figure 2:
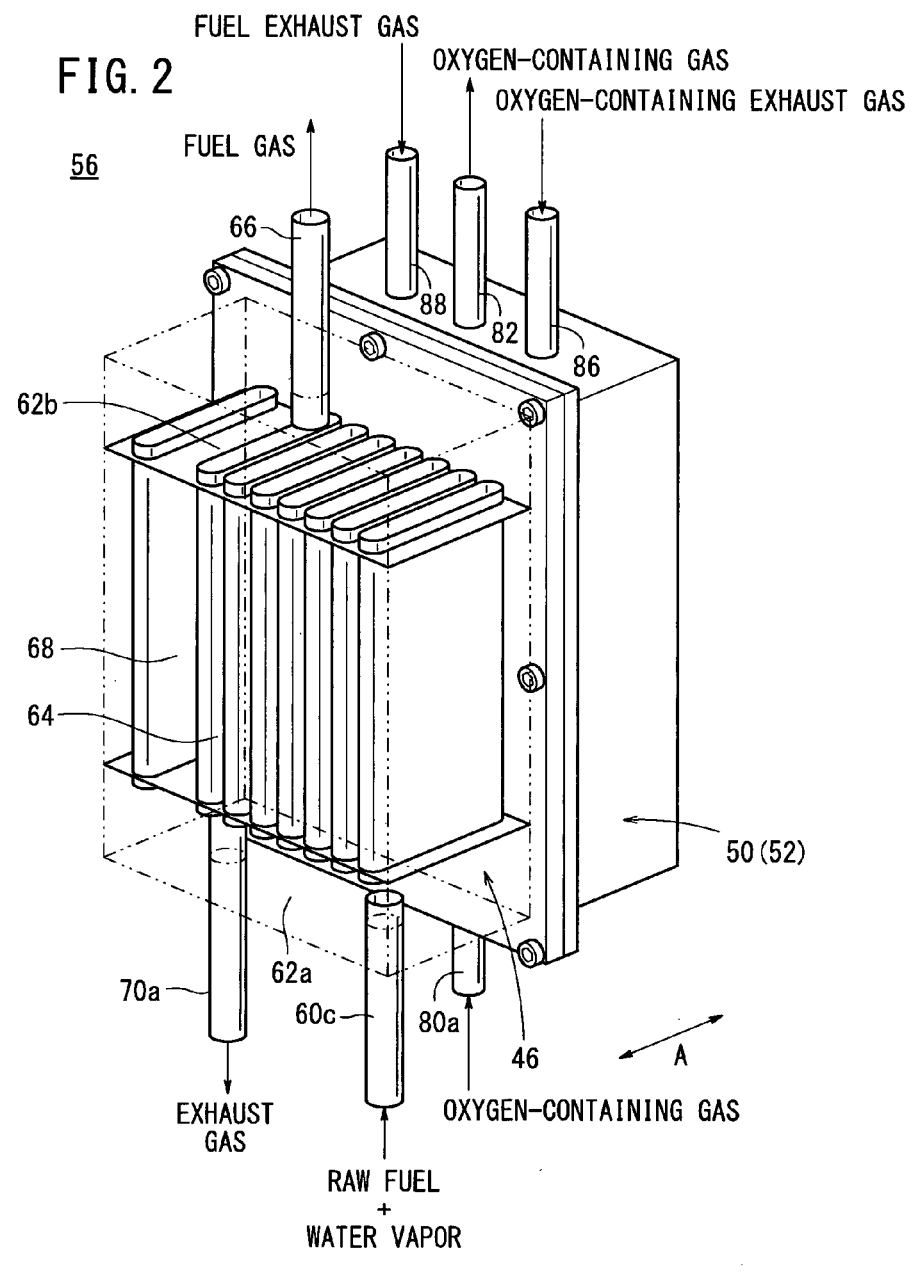
Figure 3:
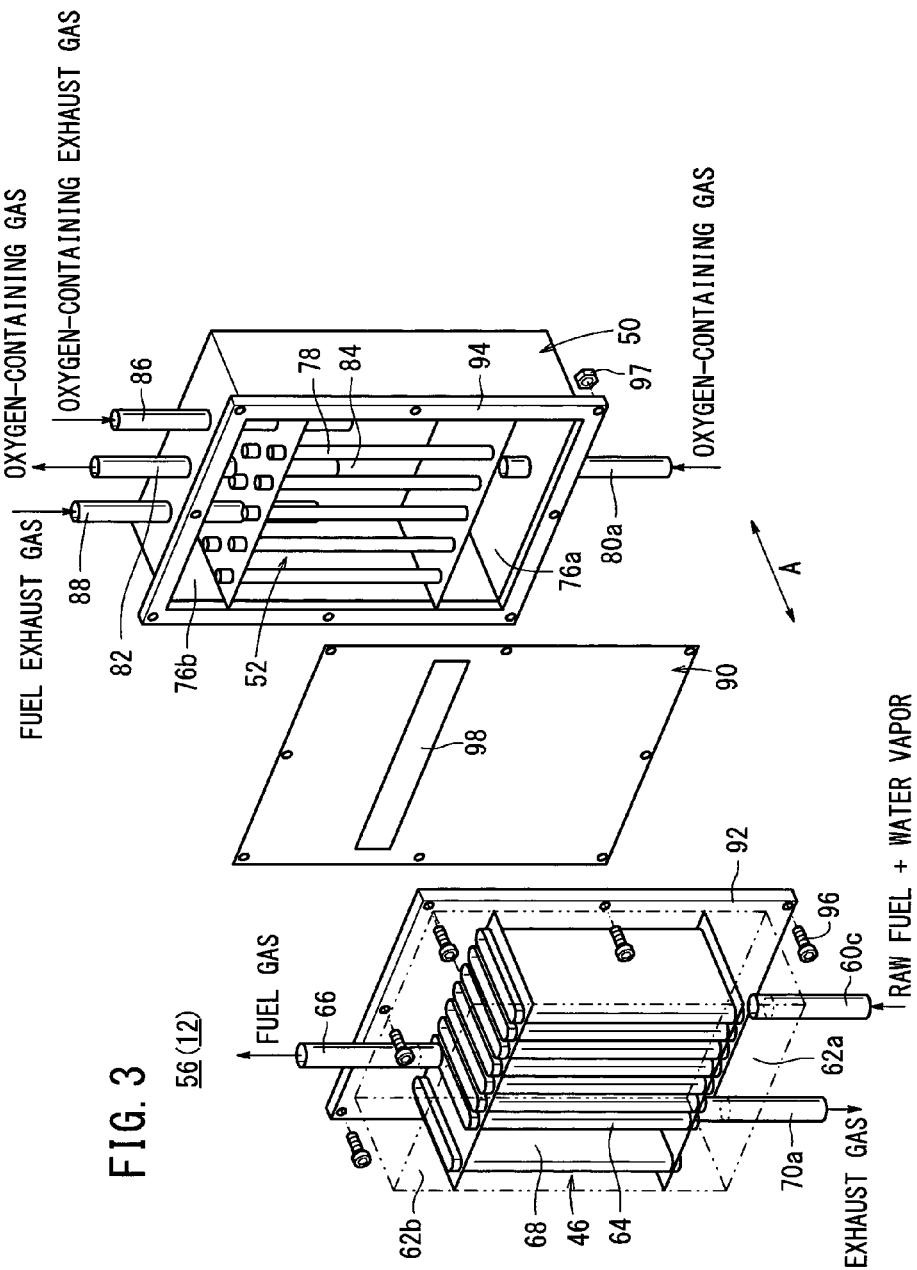
FIG. 3 is an exploded perspective view showing main components of the FC peripheral equipment.

As shown in FIGS. 2 and 3, the heat exchanger 50 is provided upright, and as described later, the oxygen-containing gas flows vertically upwardly. The steam reformer 46 is provided upright, and the reformed gas flows vertically upwardly. The steam reformer 46 is directly attached to one side (one end) of the heat exchanger 50. The steam reformer 46 and the heat exchanger 50 (including the exhaust gas combustor 52) are stacked in a horizontal direction indicated by an arrow A.

The evaporator 48, the partial oxidation reformer 45, and a desulfurizer 58 for removing sulfur compounds contained in the city gas (raw fuel) are provided below the heat exchanger 50 and the steam reformer 46.

The steam reformer 46 is a preliminary reformer for steam-reforming higher hydrocarbon ($C_{2+}$) such as ethane ($C_2H_6$), propane ($C_3H_8$), and butane ($C_4H_{10}$) in the city gas (raw fuel) thereby to produce the fuel gas chiefly containing methane ($CH_4$), hydrogen, and CO. The operating temperature of the steam reformer 46 is several hundred ° C.

The partial oxidation reformer 45 is a preliminary reformer for partially oxidation-reforming higher hydrocarbon ($C_{2+}$) such as ethane ($C_2H_6$), propane ($C_3H_8$), and butane ($C_4H_{10}$) in the city gas (raw fuel) thereby to produce the fuel gas chiefly containing hydrogen, and CO. The operating temperature of the partial oxidation reformer 45 is several hundred ° C.

The fuel cell 22 operates at high temperature, such as several hundred ° C. Methane in the fuel gas is reformed at the anode 30 to obtain hydrogen and CO, and the hydrogen and CO are supplied to a portion of the electrolyte 26 that is positioned adjacent to the anode 30.

As shown in FIG. 1, a raw fuel channel 60a of the raw fuel supply apparatus 14 is connected to the inlet of the desulfurizer 58 and a raw fuel supply channel 60b is connected to the outlet of the desulfurizer 58. This raw fuel supply channel 60b is connected to a mixed gas inlet 61a of the partial oxidation reformer 45, and a fuel gas pipe (fuel pipe) 60c connected to a fuel gas outlet 61b of the partial oxidation reformer 45 is connected to a mixed gas supply chamber (mixed gas inlet) 62a of the steam reformer 46.

As shown in FIGS. 2 and 3, the mixed gas supply chamber 62a is connected to lower ends of a plurality of reforming pipes 64, and a fuel gas discharge chamber (fuel gas outlet) 62b is connected to upper ends of the reforming pipes 64. The fuel gas discharge chamber 62b is connected to one end of a fuel gas channel 66, and the other end of the fuel gas channel 66 is connected to the fuel gas supply passage 44a of the fuel cell stack 24 (see FIG. 1). Each of the reforming pipes 64 is filled with catalyst (not shown) in the form of pellets or supports catalyst (not shown) in the form of grains for inducing reforming reaction.

A heating space 68 is formed between the reforming pipes 64. An end of an exhaust gas pipe 70a is opened to the heating space 68, and as shown in FIG. 1, the other end of the exhaust gas pipe 70a is connected to an inlet of a heating channel 72 of the evaporator 48. An exhaust pipe 70b is connected to an outlet of the heating channel 72 of the evaporator 48.

A water channel 74a of the water supply apparatus 18 is connected to a water inlet 73a of the evaporator 48, and water flowing through the water channel 74a is heated by the exhaust gas flowing along the heating channel 72. As a result, water vapor is produced. One end of a water vapor pipe 74b is connected to a water vapor outlet 73b of the evaporator 48, and the other end of the water vapor pipe 74b is merged to the fuel gas pipe 60c at a position downstream of the partial oxidation reformer 45. For example, an ejector (not shown) is provided at the merging position, and the raw fuel (or reform gas) flows through the fuel gas pipe 60c, whereby water vapor is sucked from the water vapor pipe 74b into the fuel gas pipe 60c.

As shown in FIG. 3, an oxygen-containing gas supply chamber 76a is provided on the lower side of the heat exchanger 50, and an oxygen-containing gas discharge chamber 76b is provided on the upper side of the heat exchanger 50. Both ends of a plurality of oxygen-containing gas pipes 78 are connected to the oxygen-containing gas supply chamber 76a and the oxygen-containing gas discharge chamber 76b.

One end of a first oxygen-containing gas supply channel 80a is provided in the oxygen-containing gas supply chamber 76a. One end of an oxygen-containing gas channel 82 is provided in the oxygen-containing gas discharge chamber 76b, and the other end of the oxygen-containing gas channel 82 is connected to the oxygen-containing gas supply passage 42a of the fuel cell stack 24 (see FIG. 1).

A plurality of the oxygen-containing gas pipes 78 are placed in a space inside the heat exchanger 50. Further, a combustion chamber 84 of the exhaust gas combustor 52 is formed inside the heat exchanger 50. The combustion chamber 84 functions as a heat source for raising the temperature of the oxygen-containing gas by combustion reaction of the fuel gas (more specifically, fuel exhaust gas) and the oxygen-containing gas (more specifically, oxygen-containing exhaust gas).

An oxygen-containing exhaust gas channel 86 and a fuel exhaust gas channel 88 extend from the oxygen-containing gas discharge chamber 76b side and through the oxygen-containing gas discharge chamber 76b, and one end of the oxygen-containing exhaust gas channel 86 and one end of the fuel exhaust gas channel 88 are provided in the combustion chamber 84. As shown in FIG. 1, the other end of the oxygen-containing exhaust gas channel 86 is connected to the oxygen-containing gas discharge passage 42b of the fuel cell stack 24, and the other end of the fuel exhaust gas channel 88 is connected to the fuel gas discharge passage 44b of the fuel cell stack 24.

As shown in FIG. 3, a wall plate (wall) 90 is provided between the steam reformer 46 and the heat exchanger 50. The wall plate 90 is sandwiched between a flange 92 of the steam reformer 46 and a flange 94 of the heat exchanger 50. These components are fixed together using a plurality of bolts 96 and nuts 97. An opening 98 is formed in the wall plate 90 for supplying a combustion gas produced in the combustion chamber 84 of the heat exchanger 50 to the heating space 68 of the steam reformer 46.

As shown in FIG. 1, the oxygen-containing gas supply apparatus 16 has an oxygen-containing gas regulator valve (oxygen-containing gas distribution mechanism) 102 for distributing the oxygen-containing gas from an oxygen-containing gas channel 100 to the heat exchanger 50 and the partial oxidation reformer 45, i.e., to the first oxygen-containing gas supply channel 80a and a second oxygen-containing gas supply channel 80b. The second oxygen-containing gas supply channel 80b is positioned between the desulfurizer 58 and the partial oxidation reformer 45, and connected to the raw fuel supply channel 60b.

Figure 4:
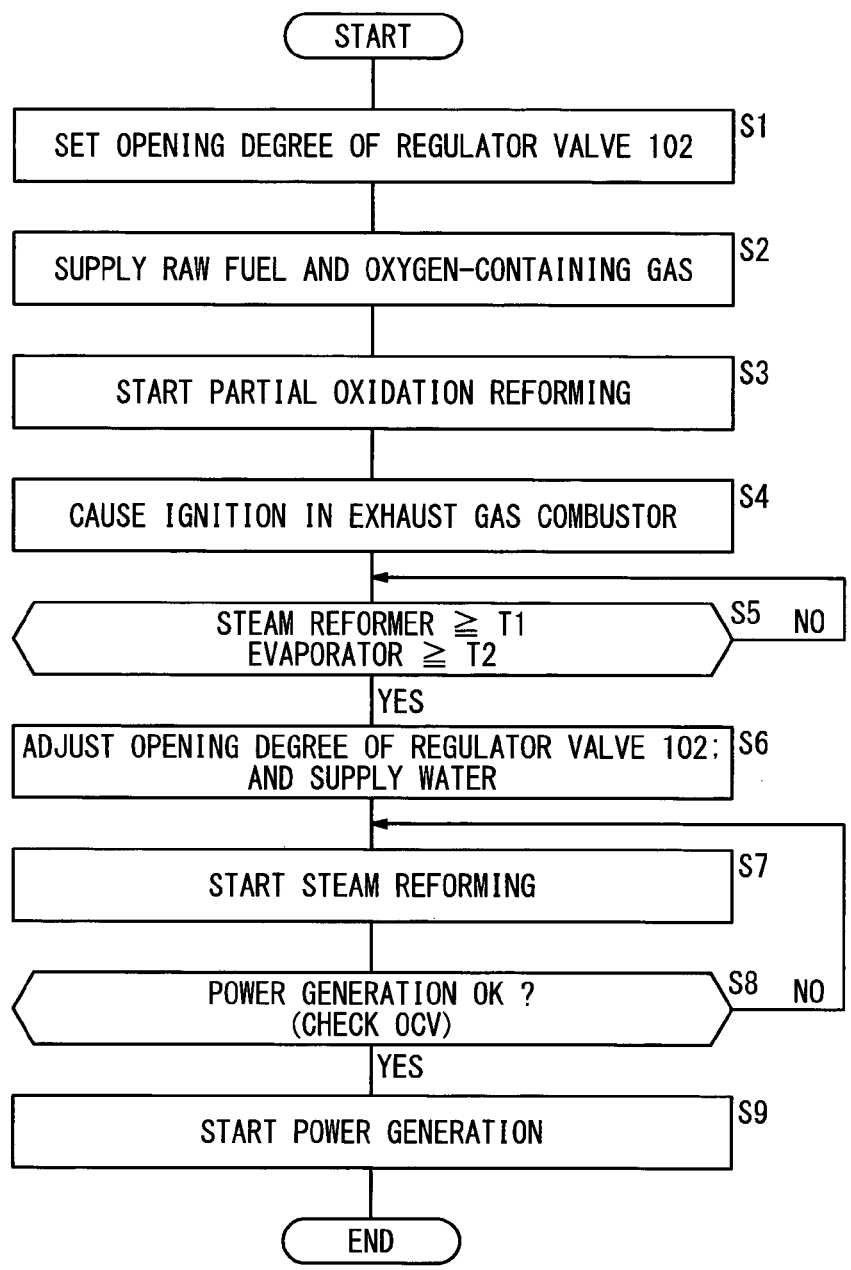
FIG. 4 is a flow chart illustrating an operational sequence from start-up operation to power generation of the fuel cell system.
Figure 5:
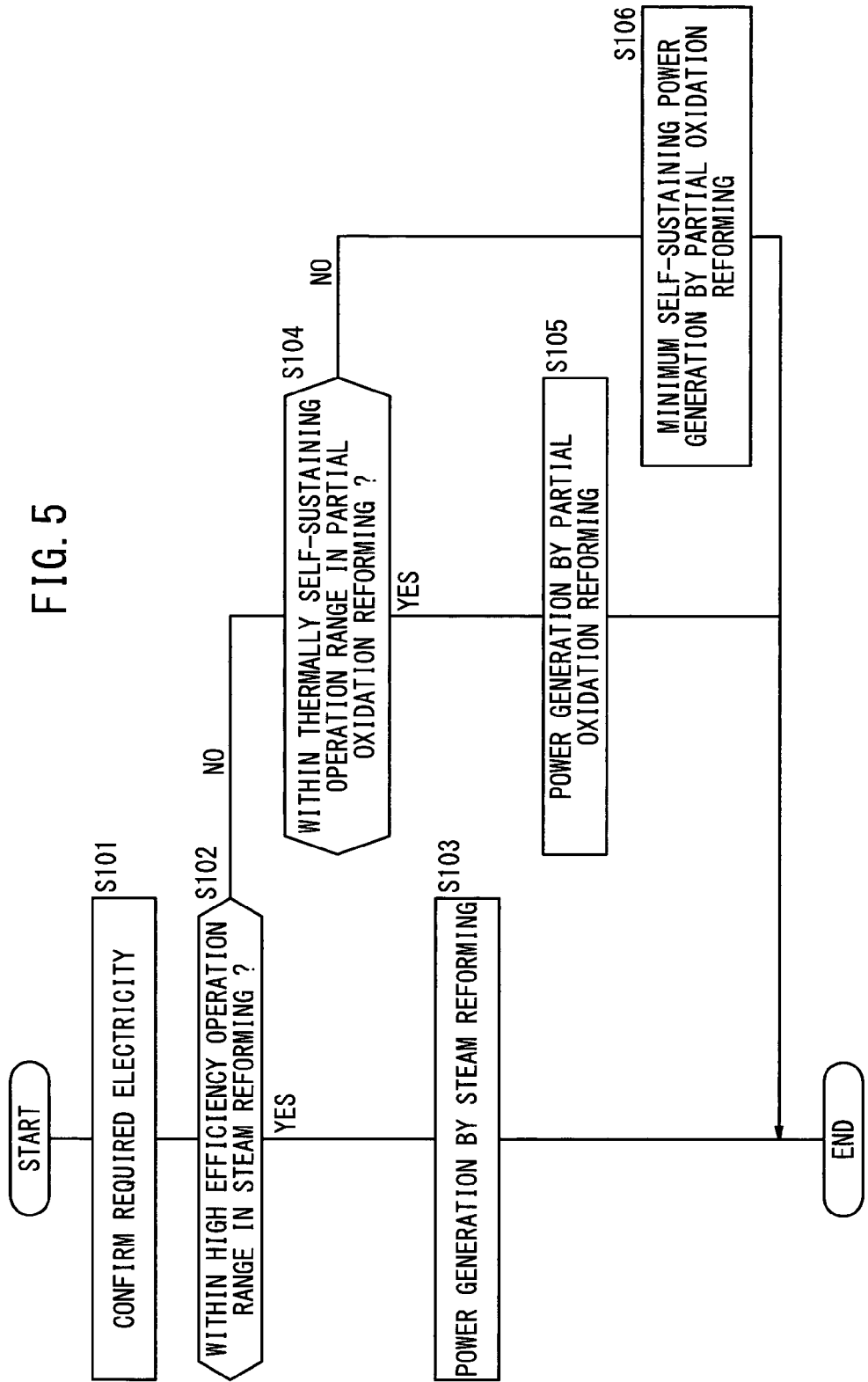
FIG. 5 is a flow chart showing an operational sequence from a power generation to a low-load operation of the fuel cell system.
Figure 7:
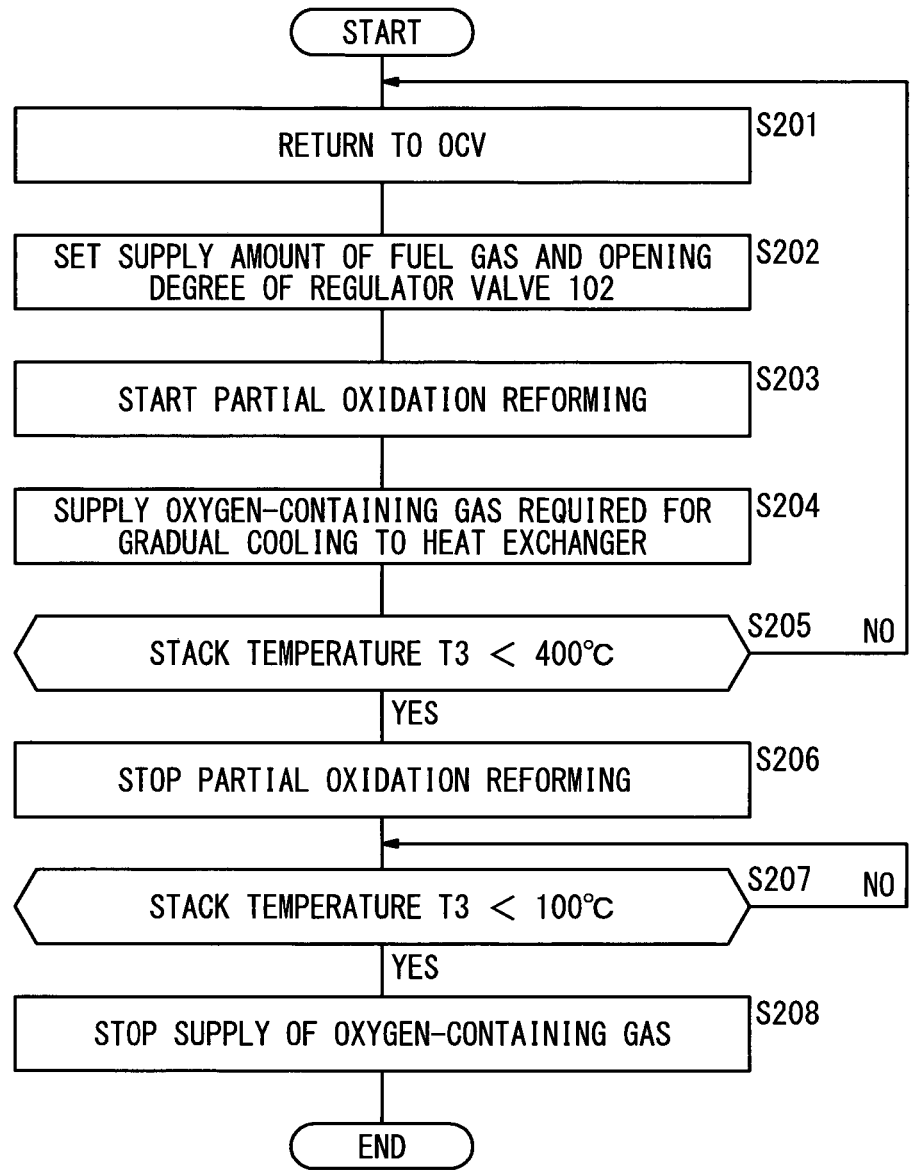
FIG. 7 is a flow chart showing an operational sequence of stopping power generation of the fuel cell system.

Next, operation of the fuel cell system 10 will be described below with reference to flow charts shown in FIGS. 4, 5 and 7.

Firstly, at the time of starting operation of the fuel cell system 10, the opening degree of the oxygen-containing gas regulator valve 102 is determined (step S1). More specifically, the raw fuel supply apparatus 14 is operated, and the opening degree of the oxygen-containing gas regulator valve 102 is adjusted such that the air (oxygen-containing gas) and the raw fuel such as city gas (containing $CH_4$, $C_2H_6$, $C_3H_8$, $C_4H_{10}$) required for partial oxidation reforming are supplied (step S2). The control of the partial oxidation reforming is performed based on the air fuel ratio ($O_2/C$) (the number of moles of oxygen in the supplied air/the number of moles of carbon in the supplied raw fuel). The air and raw fuel are supplied to the partial oxidation reformer 45 at the optimum air-fuel ratio.

In the raw fuel supply apparatus 14, the raw fuel supplied to the raw fuel channel 60a is desulfurized by the desulfurizer 58, and then the raw fuel is supplied to the mixed gas inlet 61a of the partial oxidation reformer 45 through the raw fuel supply channel 60b. In the oxygen-containing gas supply apparatus 16, after the air is supplied to the oxygen-containing gas channel 100, the air is distributed to the first oxygen-containing gas supply channel 80a and to the second oxygen-containing gas supply channel 80b at their respective predetermined amounts through the oxygen-containing gas regulator valve 102. The air distributed to the second oxygen-containing gas supply channel 80b is mixed with the raw fuel in the raw fuel supply channel 60b, and the mixture containing the air is supplied to the mixed gas inlet 61a of the partial oxidation reformer 45.

Thus, partial oxidation reforming by the partial oxidation reformer 45 is started (step S3). For example, if $O_2/C=0.5$, partial oxidation reaction ($2CH_4+O_2 \rightarrow 4H_2+2CO$) occurs.

The partial oxidation reaction is an exothermic reaction, and a hot reduction gas (at about 600° C.) is produced by the partial oxidation reformer 45.

As shown in FIGS. 2 and 3, the hot reduction gas is supplied to the mixed gas supply chamber 62a of the steam reformer 46 through the fuel gas pipe 60c, and then, the reduction gas moves from lower ends to upper ends of the reforming pipes 64. The hot reduction gas is temporarily supplied to the fuel gas discharge chamber 62b, and then, the reduction gas is supplied to the fuel gas supply passage 44a of the fuel cell stack 24 through the fuel gas channel 66 (see FIG. 1).

In the fuel cell stack 24, after the hot reduction gas flows through the fuel gas flow field 40, the fuel gas is discharged from the fuel gas discharge passage 44b to the fuel exhaust gas channel 88. Thus, the hot reduction gas produced by the partial oxidation reformer 45 heats the steam reformer 46 and the fuel cell stack 24.

As shown in FIG. 3, the fuel exhaust gas channel 88 is opened to the combustion chamber 84 of the exhaust gas combustor 52, and the fuel gas flows into the combustion chamber 84. In the combustion chamber 84, the reduction gas (fuel gas) and the oxygen-containing gas are ignited by self-ignition or by an ignition device (not shown) such as an igniter or a glow to produce a combustion gas (step S4).

The combustion gas generated in the combustion chamber 84 heats the heat exchanger 50, and also heats air supplied from the first oxygen-containing gas supply channel 80a. Further, the combustion gas moves to the heating space 68 of the steam reformer 46 through the opening 98 formed in the wall plate 90. Thus, the steam reformer 46 is heated. The exhaust gas pipe 70a is provided in the heating space 68, and the exhaust gas pipe 70a is connected to the heating channel 72 of the evaporator 48. In the structure, after the combustion gas heats the evaporator 48, the combustion gas is discharged from the exhaust pipe 70b.

Then, the control proceeds to step S5 to determine whether or not the temperature of the steam reformer 46 is a predetermined temperature T1 or more and the temperature of the evaporator 48 is a predetermined temperature T 2 or more. For example, the predetermined temperature T 1 is 550° C., and for example, the predetermined temperature T 2 is 150° C. If it is determined that the temperature of the steam reformer 46 is the predetermined temperature T 1 or more and the temperature of the evaporator 48 is the predetermined temperature T2 or more (YES in step S5), then the control proceeds to step S6.

In step S6, for transition from partial oxidation reaction to steam reforming reaction, the opening degree of the oxygen-containing gas regulator valve 102 is adjusted, and the water supply apparatus 18 is operated. By adjustment of the opening degree of the oxygen-containing gas regulator valve 102, supply of the air to the second oxygen-containing gas supply channel 80b is stopped, and the amount of air supplied from the first oxygen-containing gas supply channel 80a to the heat exchanger 50 is increased. Thus, since only the raw fuel is supplied to the partial oxidation reformer 45, partial oxidation reaction is not induced, and the raw fuel is supplied to the fuel gas pipe 60c.

In the water supply apparatus 18, water is supplied to the evaporator 48. The water vaporized in the evaporator 48 is supplied from the water vapor pipe 74b to the fuel gas pipe 60c, and then, mixed with the raw fuel, and supplied to the mixed gas supply chamber 62a.

As shown in FIGS. 2 and 3, the mixed gas of the raw fuel and the water vapor supplied to the mixed gas supply chamber 62a moves from the lower ends to the upper ends of the reforming pipes 64. In the meanwhile, the mixed gas is heated by the combustion gas supplied into the heating space 68, and is subjected to steam reforming by the catalyst in the form of pellets. As a result, hydrocarbon of $C_{2+}$ is removed therefrom to produce a reformed gas chiefly containing methane, and the steam reforming reaction ($CH_4+H_2O \rightarrow 3H_2+CO$) occurs (step S7).

The reformed gas is temporarily supplied as a heated fuel gas to the fuel gas discharge chamber 62b, and then, the reformed gas is supplied to the fuel gas supply passage 44a of the fuel cell stack 24 through the fuel gas channel 66 (see FIG. 1).

In the fuel cell stack 24, after the heated fuel gas flows through the fuel gas flow field 40, the fuel gas is discharged from the fuel gas discharge passage 44b to the fuel exhaust gas channel 88. As shown in FIG. 3, since the fuel exhaust gas channel 88 is opened to the combustion chamber 84 of the exhaust gas combustor 52, the fuel gas flows into the combustion chamber 84.

On the other hand, in the oxygen-containing gas supply apparatus 16, the air is supplied to the first oxygen-containing gas supply channel 80a through the oxygen-containing gas regulator valve 102, and the air flows into the oxygen-containing gas supply chamber 76a of the heat exchanger 50.

As shown in FIG. 3, after the air flows into the oxygen-containing gas supply chamber 76a, the air is heated by the combustion gas supplied into the combustion chamber 84 (heat exchange between the air and the combustion gas occurs) while the air is moving from the lower ends to the upper ends of the oxygen-containing gas pipes 78. The heated air is firstly supplied to the oxygen-containing gas discharge chamber 76b, and then, the air is supplied through the oxygen-containing gas channel 82 to the oxygen-containing gas supply passage 42a of the fuel cell stack 24 (see FIG. 1).

In the fuel cell stack 24, after the heated air flows through the oxygen-containing gas flow field 38, the air is discharged from the oxygen-containing gas discharge passage 42b into the oxygen-containing exhaust gas channel 86. As shown in FIG. 3, since the oxygen-containing exhaust gas channel 86 is opened to the combustion chamber 84 of the exhaust gas combustor 52, the air is supplied into the combustion chamber 84.

As described above, the heated air and the heated fuel gas flow through the fuel cell stack 24 to raise the temperature of the fuel cell stack 24. Then, the control proceeds to step S8 for determining whether or not the fuel cell stack 24 is ready for power generation. More specifically, OCV (open-circuit voltage) of the fuel cell 22 is measured, and if the OCV reaches a predetermined value, then it is determined that the fuel cell stack 24 is ready for power generation (YES in step S8). Thus, power generation is started in the fuel cell stack 24 (step S9).

During power generation of the fuel cell stack 24, in the same manner as in the case of the start-up operation, the air flows through the oxygen-containing gas flow field 38, and the fuel gas flows through the fuel gas flow field 40. Therefore, the air is supplied to the cathode 28 of each fuel cell 22, and the fuel gas is supplied to the anode 30 of each fuel cell 22 to induce chemical reactions at the cathode 28 and the anode 30 for generating electricity.

The air consumed in the reaction (containing unconsumed air) is discharged as an oxygen-containing exhaust gas to the oxygen-containing exhaust gas channel 86. Further, the fuel gas consumed in the reaction (containing unconsumed fuel gas) is discharged as the fuel exhaust gas to the fuel exhaust gas channel 88. The oxygen-containing exhaust gas and the fuel exhaust gas are supplied to the exhaust gas combustor 52, and consumed in combustion in the exhaust gas combustor 52. When the temperature of the fuel gas exceeds the self-ignition temperature of the fuel gas, combustion of the air and the fuel gas is started in the combustion chamber 84.

Next, operational sequence from a power generation to a low load operation of the fuel cell system 10 will be described with reference to a flow chart in FIG. 5.

Figure 6:
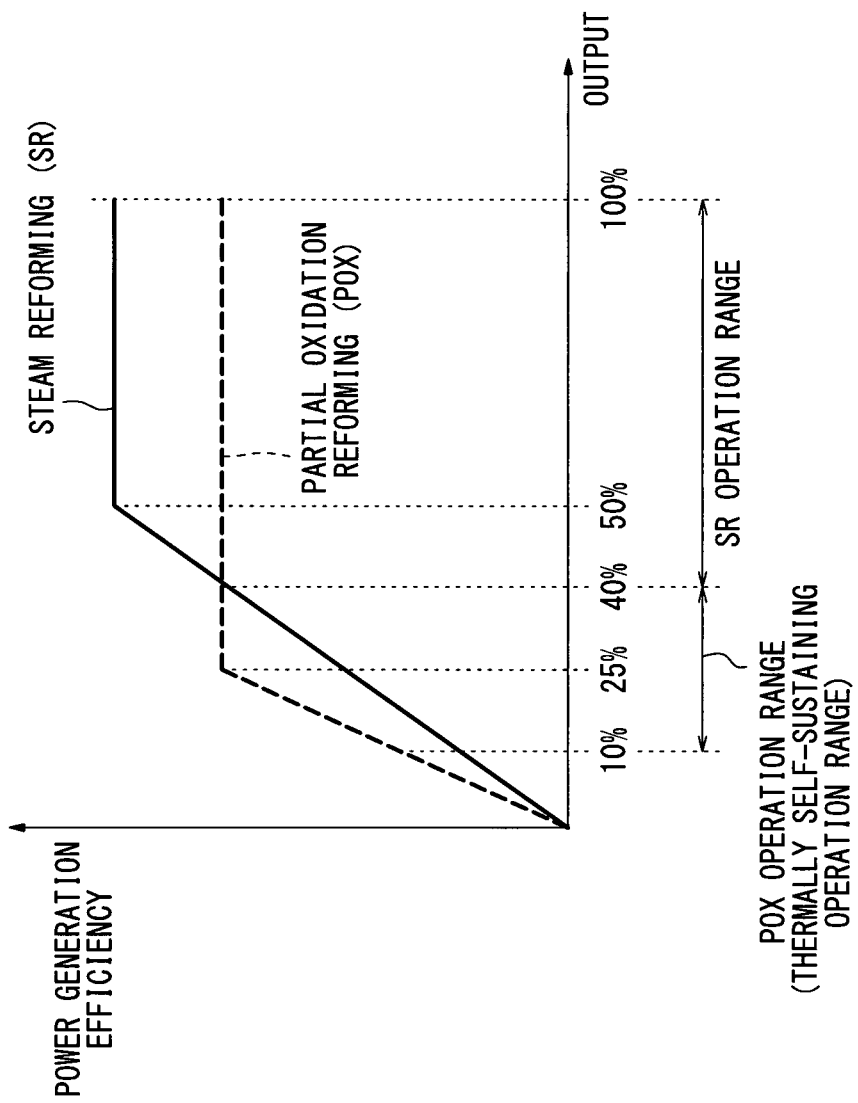
FIG. 6 is a graph showing relationships between output and efficiency in partial oxidation reforming and steam reforming.

Firstly, after a required electricity of the fuel cell stack 24 is confirmed (step S101), the control proceeds to step S102 for determining whether or not the required electricity is within a high efficiency operation range in the steam reforming. As shown in FIG. 6, the fuel cell system 10 is operated, for example, in an output range of 40% to 100% by steam reforming, and operated, for example, in an output range of 10% to 40% by partial oxidation reforming (thermally self-sustaining operation range).

If it is determined that the required electricity is within the high efficiency operation range in the steam reforming (YES in step S102), then the control proceeds to step S103 for performing power generation by steam reforming, and supplying electricity with high efficiency.

Further, if it is determined that the required electricity of the fuel cell stack 24 is not within the high efficiency operation range in the steam reforming (NO in step S102), then the control proceeds to step S104. In step S104, it is determined whether or not the required electricity is within a thermally self-sustaining operation range in the partial oxidation reforming.

If it is determined that the required electricity is within the thermally self-sustaining operation range in the partial oxidation reforming (YES in step S104), then the control proceeds to step S105 for performing power generation by partial oxidation reforming. If it is determined that the required electricity is not within the thermally self-sustaining operation range in the partial oxidation reforming (NO in step S104), then the control proceeds to step S106 for performing the minimum thermally self-sustaining power generation by partial oxidation reforming (e.g., at output of 10% in FIG. 6).

Next, operation of the fuel cell system 10 at the time of stopping power generation will be described with reference to a flow chart in FIG. 7.

Firstly, power generation is stopped, and the voltage returns to OCV (step S201). Further, the control proceeds to step S202 for setting the supply amount of the fuel gas and the opening degree of the oxygen-containing gas regulator valve 102 for transition to partial oxidation reaction. The supply amount of the fuel gas is set to be a supply amount required for maintaining the reduction state at the anode of the fuel cell stack 24.

As described above, after partial oxidation reforming is started (step S203), the air required for gradual cooling of the fuel cell stack 24 is supplied to the heat exchanger 50 while the temperature T3 of the fuel cell stack 24 is monitored (step S204). At this time, in the combustion chamber 84 of the exhaust gas combustor 52, the reduction gas (fuel gas) and the air are not allowed to be ignited.

Thus, the interior of the fuel cell stack 24 is gradually cooled, and if the temperature T3 of the fuel cell stack 24 becomes less than 400° C. (YES step S205), then the control proceeds to step S206 for stopping partial oxidation reforming. Further, if the temperature T3 of the fuel cell stack 24 becomes less than 100° C. (YES step S207), then the control proceeds to step S208 for stopping the supply of the air.

In the first embodiment, as shown in FIG. 1, the fuel gas discharge chamber 62b of the steam reformer 46 is connected to the fuel gas supply passage 44a of the fuel cell stack 24 through the fuel gas channel 66, and the fuel gas outlet 61b of the partial oxidation reformer 45 is connected to the mixed gas supply chamber 62a of the steam reformer 46 through the fuel gas pipe 60c. The water vapor pipe 74b from the evaporator 48 is merged to the fuel gas pipe 60c.

Thus, since the reduction gas at high temperature (about 600° C.) from the partial oxidation reformer 45 is guided to the steam reformer 46, the time required for starting operation of the steam reformer 46 (time required for raising the temperature and time for reduction) is shortened.

Further, since the hot reduction gas is supplied from the steam reformer 46 to the fuel gas supply passage 44a of the fuel cell stack 24 through the fuel gas channel 66, the time required for starting operation of the fuel cell stack 24 (time required for raising the temperature and time for reduction) is shortened advantageously.

Further, the hot reduction gas is supplied from the fuel cell stack 24 to the exhaust gas combustor 52. Thus, by the combustion gas produced in the exhaust gas combustor 52, the temperatures of the oxygen-containing gas, the steam reformer 46 and the evaporator 48 are raised, and time required for starting operation of the fuel cell module 12 is reduced effectively.

Further, the water vapor produced in the evaporator 48 does not flow into the partial oxidation reformer 45. Thus, it becomes possible to suppress steam oxidation of the catalyst in the partial oxidation reformer 45, and improvement in the durability is achieved easily.

Further, even if heat shortage resulting from variation in the load on the fuel cell stack 24 or the like induces shortage of reforming by the steam reformer 46, the shortage of reforming can be compensated by the partial oxidation reformer 45.

Specifically, based on a required electricity of the fuel cell stack 24, a reformed gas amount X is calculated. If the reformed gas amount X is larger than a reformed gas amount Y obtained from the steam reformer 46 (X>Y), then the reformed gas amount Y is handled by the steam reformer 46, and the difference Z, i.e., X−Y, between the reformed gas amount X and the reformed gas amount Y is handled by the partial oxidation reformer 45. Thus, it becomes possible to follow the low output and the load variation and suppress fuel shortage and carbon deposition resulting from the shortage of reforming, and improvement in the durability is achieved easily.

Further, the fuel cell module 12 includes the oxygen-containing gas regulator valve 102 for distributing the oxygen-containing gas to the heat exchanger 50 and the partial oxidation reformer 45. Thus, the fuel cell stack 24 and the peripheral equipment 56 including the heat exchanger 50 and the evaporator 48 can be heated at the same time, and the time required for starting operation of the fuel cell module 12 can be reduced.

Further, even if shortage of reforming by the steam reformer 46 is caused as a result of variation in the load on the fuel cell stack 24 or the like, the shortage of reforming can be compensated by the partial oxidation reformer 45. Thus, it becomes possible to suppress fuel shortage and carbon deposition resulting from the shortage of reforming, and improvement in the durability is achieved easily.

Further, in the fuel cell module 12, the exhaust gas combustor 52 is provided integrally in the heat exchanger 50, and the steam reformer 46 is provided adjacent one end of the heat exchanger 50.

Therefore, the steam reformer 46, the heat exchanger 50, and the exhaust gas combustor 52 are substantially combined together. Thus, heat loss from the fuel cell module 12 is minimized as much as possible. Accordingly, thermally self-sustaining operation of the fuel cell module 12 is facilitated. Further, combustion circuits (e.g., pipes) are simplified, and the number of components is reduced. Thus, the size of the fuel cell module 12 is minimized, and cost reduction thereof is achieved.

Further, the fuel cell module 12 is a solid oxide fuel cell module. Therefore, the fuel cell module 12 is applicable to high temperature type fuel cells 22 such as SOFC.

Figure 8:
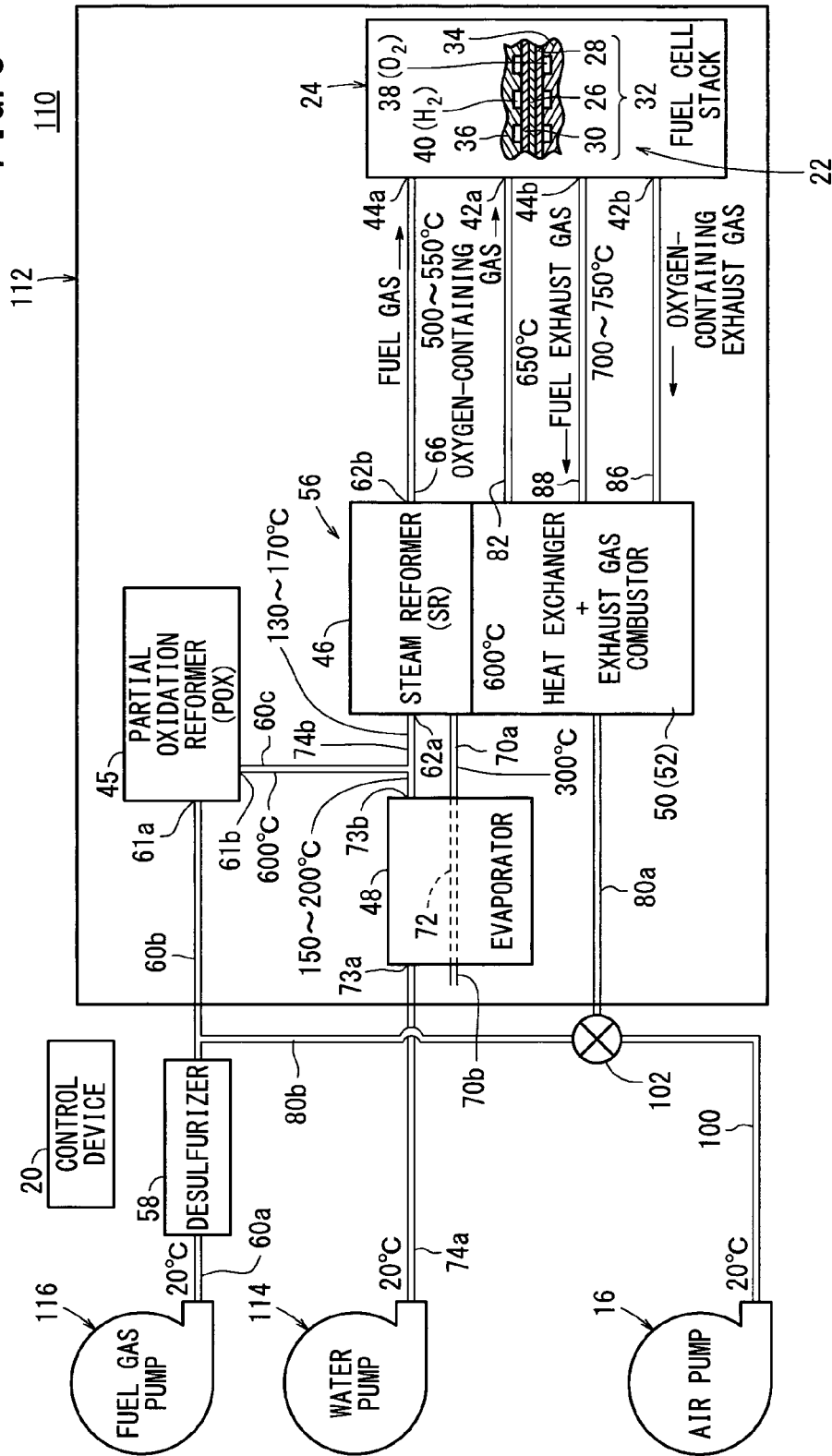
FIG. 8 is a diagram schematically showing a fuel cell system according to a second embodiment of the present invention.
Figure 9:
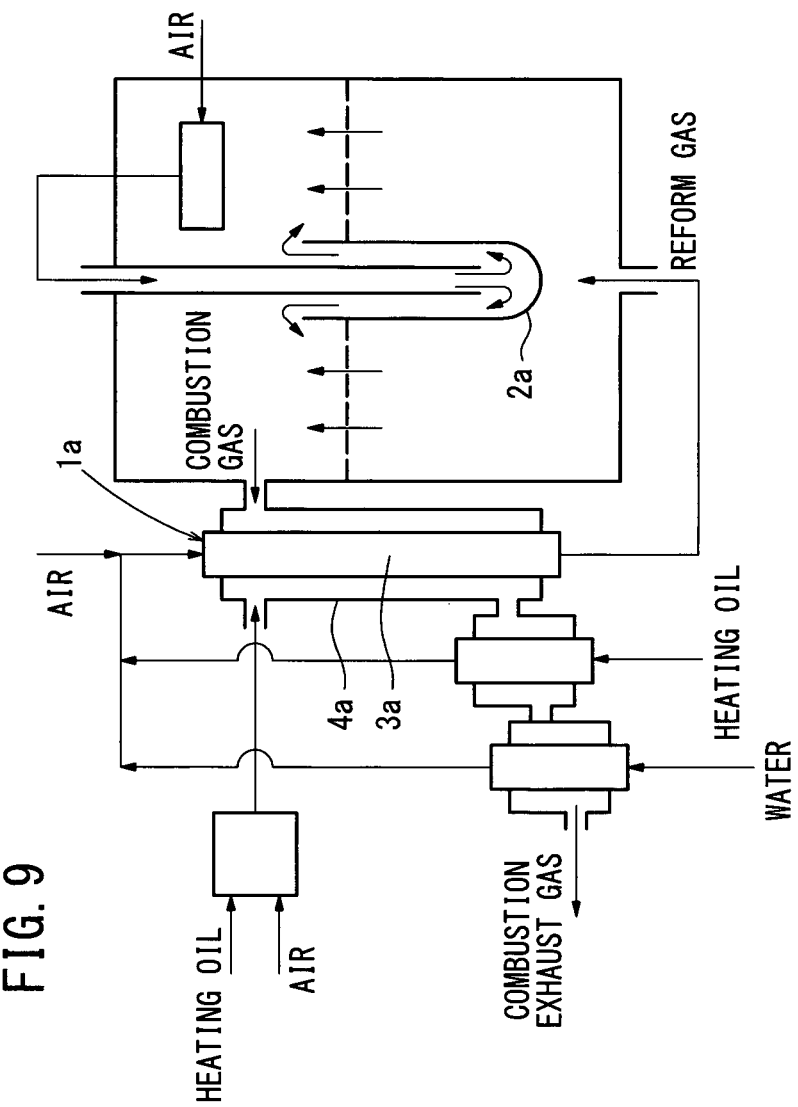
FIG. 9 is a diagram showing a start-up method disclosed in Conventional Technique 1.
Figure 10:
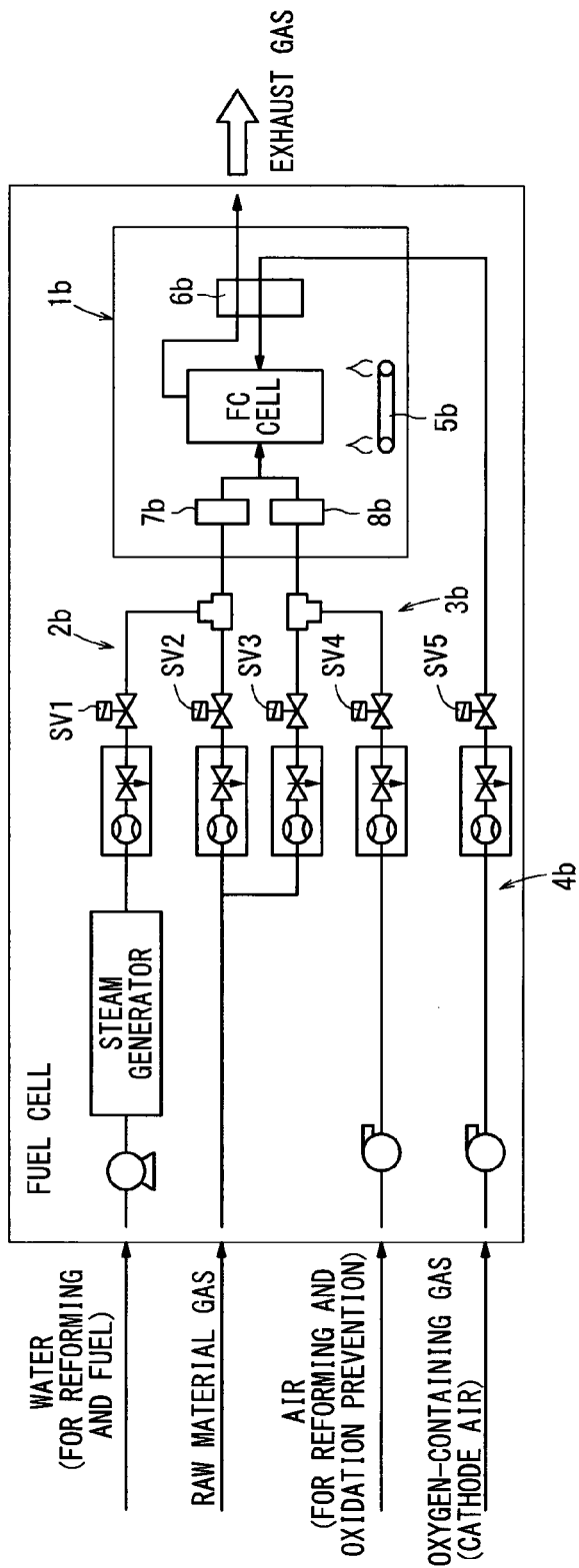
FIG. 10 is a view schematically showing a fuel cell disclosed in Conventional Technique 2.

FIG. 8 is a diagram schematically showing a fuel cell system 110 according to a second embodiment of the present invention. The constituent elements of the fuel cell system 110 that are identical to those of the fuel cell system 10 according to the first embodiment are labeled with the same reference numerals, and description thereof will be omitted.

The fuel cell system 110 includes a fuel cell module 112, a water supply apparatus 114, a raw fuel supply apparatus 116, an oxygen-containing gas supply apparatus 16, and a control device 20. The water supply apparatus 114 is connected to a mixed gas supply chamber 62a of the steam reformer 46 through a water channel 74a, an evaporator 48 and a water vapor pipe 74b.

The raw fuel supply apparatus 116 includes a raw fuel channel 60a, a desulfurizer 58, a raw fuel supply channel 60b, a partial oxidation reformer 45, and a fuel gas pipe 60c. The fuel gas pipe 60c is merged to a position in the middle of the water vapor pipe 74b. For example, an ejector (not shown) is provided at the merging position. The water vapor flows through the water vapor pipe 74b, whereby the raw fuel (or the reform gas) is sucked from the fuel gas pipe 60c to the water vapor pipe 74b.

In the second embodiment, the fuel gas discharge chamber 62b of the steam reformer 46 is connected to the fuel gas supply passage 44a of the fuel cell stack 24 through the fuel gas channel 66, and the evaporator 48 is connected to the mixed gas supply chamber 62a of the steam reformer 46 through the water vapor pipe 74b. The fuel gas pipe 60c extends from the fuel gas outlet 61b of the partial oxidation reformer 45, and is merged to the water vapor pipe 74b.

In the structure, in the second embodiment, the same advantages as in the case of the first embodiment are obtained. For example, the water vapor produced in the evaporator 48 does not flow into the partial oxidation reformer 45, and it becomes possible to suppress water vapor oxidation of the catalyst in the partial oxidation reformer 45.

Although certain preferred embodiments of the present invention have been shown and described in detail, it should be understood that various changes and modifications may be made therein without departing from the scope of the appended claims.

The invention claimed is:

1. A fuel cell module comprising:
a fuel cell stack formed by stacking a plurality of fuel cells for generating electricity by electrochemical reactions of a fuel gas and an oxygen-containing gas;
a partial oxidation reformer for reforming a mixed gas of a raw fuel chiefly containing hydrocarbon and an oxygen-containing gas;
a steam reformer for reforming a mixed gas of the raw fuel and water vapor;
an evaporator for evaporating water and supplying water vapor to the steam reformer;
a heat exchanger for raising the temperature of the oxygen-containing gas by heat exchange with a combustion gas, and supplying the oxygen-containing gas to the fuel cell stack; and
an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas;

wherein a fuel gas outlet of the steam reformer is connected to a fuel gas inlet of the fuel cell stack through a fuel gas channel;

a fuel gas outlet of the partial oxidation reformer is connected to a mixed gas inlet of the steam reformer through a fuel pipe, and a water vapor pipe connected to a water vapor outlet of the evaporator is merged to the fuel pipe;

the exhaust gas combustor is housed inside a first chamber that houses the heat exchanger, and the steam reformer is housed inside a second chamber, the first chamber and the second chamber being separate members that are fixed to one other.

2. The fuel cell module according to claim 1, further including an oxygen-containing gas distribution mechanism for distributing the oxygen-containing gas to the heat exchanger and the partial oxidation reformer.

3. The fuel cell module according to claim 1, wherein the exhaust gas combustor is provided integrally in the heat exchanger, and the steam reformer is provided adjacent to one end of the heat exchanger.

4. The fuel cell module according to claim 1, wherein the fuel cell module is a solid oxide fuel cell module.

5. A fuel cell module comprising:

a fuel cell stack formed by stacking a plurality of fuel cells for generating electricity by electrochemical reactions of a fuel gas and an oxygen-containing gas;

a partial oxidation reformer for reforming a mixed gas of a raw fuel chiefly containing hydrocarbon and an oxygen-containing gas;

a steam reformer for reforming a mixed gas of the raw fuel and water vapor;

an evaporator for evaporating water, and supplying water vapor to the steam reformer;

a heat exchanger for raising the temperature of the oxygen-containing gas by heat exchange with a combustion gas, and supplying the oxygen-containing gas to the fuel cell stack; and an exhaust gas combustor for combusting the fuel gas discharged from the fuel cell stack as a fuel exhaust gas and the oxygen-containing gas discharged from the fuel cell stack as an oxygen-containing exhaust gas to produce the combustion gas;

wherein a fuel gas outlet of the steam reformer is connected to a fuel gas inlet of the fuel cell stack through a fuel gas channel;

a water vapor outlet of the evaporator is connected to a mixed gas inlet of the steam reformer through a water vapor pipe, and a fuel pipe connected to a fuel gas outlet of the partial oxidation reformer is merged to the water vapor pipe;

the exhaust gas combustor is housed inside a first chamber that houses the heat exchanger, and the steam reformer is housed inside a second chamber, the first chamber and the second chamber being separate members that are fixed to one other.

6. The fuel cell module according to claim 5, further including an oxygen-containing gas distribution mechanism for distributing the oxygen-containing gas to the heat exchanger and the partial oxidation reformer.

7. The fuel cell module according to claim 5, wherein the exhaust gas combustor is provided integrally in the heat exchanger, and the steam reformer is provided adjacent to one end of the heat exchanger.

8. The fuel cell module according to claim 5, wherein the fuel cell module is a solid oxide fuel cell module.

\* \* \* \* \*